Patented May 10, 1949

2,469,721

UNITED STATES PATENT OFFICE 2,469,721

ELECTRICAL CABLE COMPOSITION

Philip Tucker Gidley, Fairhaven, Mass., assignor, by mesne assignments, to Standard Oil Development Company, a corporation of Delaware No Drawing. Application October 21, 1944, Serial No. 559,841

8 Claims. (Cl. 260—45.5)

This invention relates to a new cable cover material, electrical insulating composition, or resistant composition. More particularly, this invention relates to a new and useful electrical cable cover which is resistant to a wide variety of deteriorating conditions: oil, sunlight, water, heat, and ozone.

An object of this invention is to provide a new cable covering composition which will withstand higher temperatures without distortion than other cable compositions heretofore available. Another object is to provide a cable cover which possesses excellent resistance to both water and oil. Other objects are a new cable cover which is resistant to sun-checking or cracking, which has very low water absorption, which has excellent dielectric strength and very low power factor. Still another object is a cable cover with reduced inflammability. A further object is to provide superior resistance to acids and alkalis.

Compositions for cable covers and other purposes consisting essentially of a mixture of a butadiene acrylic nitrile copolymer and a polyvinyl chloride are known in the art. However, these compositions have the disadvantage of softening or distorting at relatively low temperatures, particularly when the proportion of vinyl chloride is high. If the butadiene acrylonitrile copolymer is increased at the expense of the vinyl chloride to obtain greater heat resistance, electrical properties are sacrificed. Also these compositions do not possess such excellent resistance to water, acids, and alkalis as my new compositions.

Other compositions for cable covers consisting essentially of vinylidene chloride polymers are known in the art. However, these compositions possess the disadvantages of being relatively stiff at low temperatures, of requiring relatively high processing temperatures, of consuming considerable power in fabrication, or requiring special equipment to prevent decomposition at processing temperature. The high processing temperatures which must be employed make difficult the necessary incorporation of plasticizers which tends to volatilize the costly plasticizers and cause fumes which may be noxious to operators.

My new covering compositions possess excellent cold resistance, require relatively low processing temperatures, minimizing or eliminating the need for special equipment for processing.

My new insulating compositions are prepared by intimately associating, as by mill or Banbury mixing, from 5 to 90 parts of a rubbery butadiene acrylic nitrile copolymer with from 95 to 10 parts of a vinylidene chloride resin, together with pigments and other compounding materials if desired. The preferred compositions contain from 5 to 30 parts of a rubbery butadiene-acrylic nitrile copolymer and 95 to 70 parts of a hard, tough, thermoplastic resin consisting of polymerized vinylidene chloride.

The butadiene acrylic nitrile copolymer employed is a copolymer of butadiene and acrylic acid nitrile. While I prefer a copolymer consisting of 74% butadiene and 26 parts of acrylic acid nitrile (e. g. that known commercially as Perbunan), any rubbery copolymer of butadiene and acrylic acid nitrile may be employed.

As the vinylidene chloride resin I prefer the hard, tough, thermoplastic product obtained by polymerizing vinylidene chloride alone.

The following examples will serve to illustrate my invention.

In the table, the following recipe was used:

| Butadiene acrylic nitrile copolymer (74:26) | Parts |
|---|---|
| | 100 |
| Vinylidene chloride resin | 100 |
| Tricresylphosphate | 35 |
| Dicaprylphthalate | 25 |
| Litharge | 6 |
| Stearic acid | 1 |
| Sulfur | 1.5 |
| Benzothiazyl disulfide | 1 |
| Carbon black | 40 |

The vinylidene resin was placed on a hot mill and the tricresylphosphate added. The resin, still warm, is added to the rubbery butadiene-acrylonitrile copolymer and milled until dispersion is obtained. The other compounding ingredients are added on a conventional mill at normal temperatures employed for rubber. The resulting composition was vulcanized at 325° Fahrenheit for 30 minutes with results as noted in table.

Table

| | |
|---|---|
| Hardness | 75 |
| Modulus at 300% | 1,475 |
| Tensile strength | 2,685 |
| Ultimate elongation per cent | 410 |
| Volume increase (naphthenic oil) do | 1.5 |
| Volume increase (water)[1] do | 0.2 |
| Volume increase (aviation gasoline)[2] per cent | 6.8 |

[1] Immersed 10 days at 80° Fahrenheit.
[2] Immersed 1 day at 80° Fahrenheit.

Instead of carbon black, other pigments such as hard clay may be used. Compositions of vinylidene chloride resin and butadiene acrylic acid nitrile copolymer have excellent resistance to sunlight and acids. They also possess excellent electrical resistance and good flame resistance.

These new compositions may be molded for electrical insulation parts, or extruded for wire covering, or calendered for appropriate articles or otherwise used where their unique properties are desirable. These new compositions may be used in the unvulcanized state or the vulcanized state as desired.

I claim:

1. A vulcanized composition consisting predominantly of a homogeneous blend of a rubbery butadiene acrylic nitrile copolymer and a hard, tough, thermoplastic resin consisting of polymerized vinylidene chloride.

2. As a new composition of matter a homogeneous combination of a rubbery butadiene acrylic nitrile copolymer and a hard, tough, thermoplastic resin consisting of polymerized vinylidene chloride.

3. A new composition of matter consisting predominantly of a homogeneous blend of 5 to 90 parts of a rubbery butadiene acrylic nitrile copolymer and 95 to 10 parts of hard, tough, thermoplastic resin consisting of polymerized vinylidene chloride.

4. A composition consisting predominantly of a homogeneous blend of 5 to 30 parts of a rubbery butadiene acrylic nitrile copolymer and 95 to 70 parts of a hard, tough, thermoplastic resin consisting of polymerized vinylidene chloride.

5. The composition as defined in claim 1 wherein the rubbery copolymer consists of butadiene and acrylonitrile in the ratio of 74 to 26.

6. The composition as defined in claim 2 wherein the rubbery copolymer consists of butadiene and acrylonitrile in the ratio of 74 to 26.

7. The composition as defined in claim 3 wherein the rubbery copolymer consists of butadiene and acrylonitrile in the ratio of 74 to 26.

8. The composition as defined in claim 4 wherein the rubbery copolymer consists of butadiene and acrylonitrile in the ratio of 74 to 26.

PHILIP TUCKER GIDLEY.

REFERENCES CITED

The following references are of record in the file of this patent:

UNITED STATES PATENTS

| Number | Name | Date |
| --- | --- | --- |
| 2,330,353 | Henderson | Sept. 28, 1943 |
| 2,374,841 | Semon | May 1, 1945 |